(12) United States Patent
De Paoli et al.

(10) Patent No.: US 7,485,201 B2
(45) Date of Patent: Feb. 3, 2009

(54) AUTOMATIC PLANT AND METHOD FOR PRODUCING TIRES

(75) Inventors: Gianni De Paoli, Santa Guistina (IT); Alberto De Matthaeis, Milan (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 278 days.

(21) Appl. No.: 10/497,241

(22) PCT Filed: Dec. 10, 2002

(86) PCT No.: PCT/EP02/13989

§ 371 (c)(1),
(2), (4) Date: Jan. 6, 2005

(87) PCT Pub. No.: WO03/053662

PCT Pub. Date: Jul. 3, 2003

(65) Prior Publication Data

US 2007/0068617 A1 Mar. 29, 2007

(30) Foreign Application Priority Data

Dec. 21, 2001 (WO) .................... PCT/IT01/00652

(51) Int. Cl.
*B29D 30/00* (2006.01)
(52) U.S. Cl. .................... 156/111; 156/117; 156/396; 156/397
(58) Field of Classification Search .................. 156/111, 156/117, 396, 397; 242/364.7, 364.8, 364.9, 242/365–365.2, 366.2
See application file for complete search history.

(56) References Cited

U.S. PATENT DOCUMENTS

| 1,573,821 | A |   | 2/1926 | Gammeter |
|---|---|---|---|---|
| 2,755,916 | A | * | 7/1956 | McIlvried et al. ......... 242/365.2 |
| 3,455,764 | A |   | 7/1969 | Bryant |
| 3,891,155 | A | * | 6/1975 | Naegeli ...................... 242/417 |
| 4,543,149 | A |   | 9/1985 | Abe et al. |
| 4,641,794 | A | * | 2/1987 | Yamazaki et al. ......... 242/365.2 |
| 4,986,484 | A | * | 1/1991 | Coccolo .................. 242/365.2 |
| 5,595,354 | A | * | 1/1997 | Josoff ......................... 242/364 |
| 5,911,846 | A |   | 6/1999 | Tatara et al. |

(Continued)

FOREIGN PATENT DOCUMENTS

DE 37 36 926 A1 5/1989

(Continued)

*Primary Examiner*—Geoffrey L Knable
(74) *Attorney, Agent, or Firm*—Finnegan, Henderson, Farabow, Garrett & Dunner, L.L.P.

(57) ABSTRACT

An automatic plant for producing tyres includes a plurality of work stations and a plurality of devices for transferring the tyres from one work station to another work station and for moving the tyres within a same work station. Each work station is designed to assemble one or more corresponding structural components of the tyres. At least one of the structural components is supplied from a machine for producing the at least one structural component, through a dynamic storage unit, and to at least one of the work stations. A method for producing tyres includes making at least one structural component of the tyres, supplying the at least one structural component to a toroidal support, assembling the at least one structural component on the toroidal support, transferring the tyres from one work station to another, moving the tyres within a same work station, and vulcanizing the tyres.

15 Claims, 4 Drawing Sheets

U.S. PATENT DOCUMENTS 6,318,432 B1 * 11/2001 Caretta et al. ............... 152/552

FOREIGN PATENT DOCUMENTS

| | | |
|---|---|---|
| DE | 40 10 586 C1 | 6/1991 |
| EP | 0 369 237 A1 | 5/1990 |
| EP | 0 448 407 A2 | 9/1991 |
| EP | 0 926 680 A1 | 7/1999 |
| EP | 0 976 535 A2 | 2/2000 |
| EP | 1 033 236 A2 | 9/2000 |
| WO | WO 00/35666 | 6/2000 |
| WO | WO 01/39963 A1 | 6/2001 |

* cited by examiner

AUTOMATIC PLANT AND METHOD FOR PRODUCING TIRES

CROSS-REFERENCE TO RELATED APPLICATIONS

This application is a national-phase entry under 35 U.S.C. § 371 from International Application No. PCT/EP02/13989, filed Dec. 10, 2002, in the European Patent Office, the content of which is relied upon and incorporated herein by reference; additionally, Applicants claim the right of priority under 35 U.S.C. § 119(a)-(d) based on patent application No. PCT/IT01/00652, filed Dec. 21, 2001, in the Italian Patent Office.

BACKGROUND OF THE INVENTION

1. Field of the Invention

The present invention relates to a dynamic storage unit for structural components of tyres, in a plant in which said components are produced at the time of their application to a tyre being manufactured.

2. Description of the Related Art

U.S. Pat. No. 4,543,149 describes a supporting apparatus for strips of elastomeric material used for wrapping turns of bead wires of tyres. Said apparatus comprises a stationary structure and a movable structure comprising a sequence of reels on which said strip of elastomeric material is wound. Means for joining two ends of different strips are provided on said stationary structure. The strip is unwound from each individual reel. Whenever a reel becomes empty, the end of the strip of this reel is joined to the initial end of the next reel. The movable structure moves the reels in such a way as to place them in a position for correct unwinding and in a position for facilitating the joining to the end of the preceding reel in the sequence.

A tyre for vehicle wheels normally comprises a carcass structure, essentially consisting of one or more carcass plies shaped in an essentially toroidal configuration and having its axially opposite lateral edges engaged with corresponding annular reinforcing structures incorporating circumferentially inserts, usually called "bead wires". Each annular reinforcing structure is incorporated in what is called a "bead" which is formed along an inner circumferential edge of the tyre to secure the tyre to a corresponding fitting rim.

A belt structure comprising one or more belt strips shaped in the form of closed rings, essentially consisting of textile or metal cords suitably orientated with respect to each other and to the cords belonging to the adjacent carcass plies, is applied in a radially external position to the carcass structure.

A tread band, normally consisting of a strip of elastomeric material of suitable thickness, is also applied to the belt structure in a radially external position.

It should be noted that, for the purposes of the present description, the term "elastomeric material" denotes the mixture of rubber in its entirety, in other words the assembly formed by at least one polymeric base suitably amalgamated with reinforcing fillers and/or process additives of various types.

A pair of sidewalls is applied on opposite sides of the tyre, each sidewall covering a lateral portion of the tyre lying between what is called the shoulder area, located in the proximity of the corresponding lateral edge of the tread band, and the corresponding bead.

Given all the above, it should be noted that each type of tyre is essentially distinguished from the others by a set of chemico-physical, structural, dimensional and visual characteristics.

The chemico-physical characteristics are essentially dependent on the type and composition of the materials, particularly the recipes of the various mixtures used in the formation of the elastomeric materials. The structural characteristics are essentially concerned with the number and type of structural components present in the tyre, and their positioning with respect to each other in the tyre structure. The dimensional characteristics relate to the geometrical measurements and to the cross-sectional profile of the tyre (the external diameter, the chord or maximum width, the height of the sidewall and their ratio, in other words the section ratio), and are referred to below simply as the "specification". The visual characteristics consist of the groove design of the rolling surface of the tread, the ornamental patterns and the various distinctive pieces of wording or signs reproduced on the tyre, for example on the sidewalls of the tyre, and are referred to jointly as the "tread design" in the remainder of the present description.

Conventional production processes essentially comprise four distinct steps in the manufacture of tyres:
a) preparation of the mixtures,
b) forming of the individual structural components,
c) assembly of the different structural components in succession, to produce a crude tyre on a drum or other suitable support,
d) vulcanization of the crude tyre with simultaneous moulding of the tread design on the outer surface of the tyre.

For the purposes of the present description, the term "type of tyre" denotes a tyre having a particular specification, specified structural components, and a specified tread design.

Patent application WO0139963 in the name of the present Applicant describes an automatic plant for producing types of tyres different from each other, comprising:
 a manufacturing unit having a plurality of work stations, each designed to assemble at least one corresponding structural component on at least one type of tyre being processed,
 a vulcanizing unit, having vulcanizing moulds for the types of tyres which have been manufactured,
 devices for the functional transfer and movement of the tyres being processed, operating between said work stations and the vulcanizing unit.

Each of these structural components is made directly at the time of assembly, using a semi-finished base product supplied in a predetermined quantity according to the type of tyre being processed.

SUMMARY OF THE INVENTION

A characteristic of the invention according to this patent application is that the structural components of the tyre are essentially prepared at the moment of their deposition, thus enabling the operations to be carried out without the use of previously stored semi-finished products, and enabling each unit to be adapted immediately to the type of tyre being processed, without wastage of material.

Said structural components of a tyre are essentially of three types:
1. exclusively elastomeric structural components of elongated shape (elongate components),
2. structural components of elongated shape, each comprising a band consisting of a plurality of rubberized cords preferably lying parallel to each other (strip components),
3. structural components of elongated shape, each consisting of a single rubberized cord (filamentary components).

The components of the first type can advantageously be supplied in the plant by means of an extruder, for example, at the moment of their deposition on a type of tyre being manufactured. Examples of these components are the "liner", the tread band, the sidewalls and elastomeric fillers in general.

Examples of components of the second type are the carcass plies and the belt strips, which are prepared by suitable machines.

Examples of components of the third type are the bead wires and the 0 degree nylon.

The Applicant has observed that, in a flexible plant as mentioned above, or more generally in a plant in which different types of tyre are produced simultaneously, the quantity of these structural components required by the plant is variable, and depends on the number of different types of tyre to be produced in a predetermined period (for example, 30 minutes).

This is because, considered overall, in a longer time interval (a week, for example), the plant requires a quantity of a given structural component essentially matching the quantity produced. However, in production conditions, in a sufficiently short period, for example 30 minutes, the- quantity of the structural component required by the plant is extremely variable. On the other hand, the quantity of said component produced in this period is essentially fixed.

In particular, for structural components such as the carcass plies, the required quantity of strip and filamentary components is highly variable, depending on the sequence of types of tyre being processed.

The Applicant has found that a flexible plant of the type described above, in which said structural components are prepared essentially at the moment of their deposition, requires, in order to maintain continuous production of these components, the presence of a dynamic storage device for these structural components, which operates independently of the quantity of structural components produced and independently of the quantity of structural components required. Such a storage unit enables the production of said components to be kept essentially unchanged even in the presence of any. variations in speed during the deposition of these components on the tyres being manufactured. In particular, the present invention is applicable to windable structural components, such as strip and filamentary components.

Such possible slowing of the process may be caused, for example, at the stage of deposition of the aforesaid carcass plies, when a change is made from a successive type of tyre being processed with a larger specification to a type of tyre being processed with a smaller specification, which requires a shorter ply length, and therefore, in general, a smaller quantity of said structural component.

Therefore, the Applicant has found that by compensating the difference between the produced quantity of the structural component and the quantity of said component required for a limited period of time it is possible to continuously supply the said plant with said structural component.

A first aspect of the present invention relates to an automatic plant for producing tyres comprising:

a manufacturing unit having a plurality of work stations, each designed to assemble at least one corresponding structural component of the processed tyres;

a plurality of devices for transferring the processed tyres from one work station to another work station and for moving the processed tyres within the same work station;

a vulcanizing unit comprising at least one vulcanizing mould for the processed tyres;

wherein said at least one structural component is supplied to at least one of said work stations from a machine for producing said structural component through a dynamic storage unit.

According to a further aspect the present invention relates to a method for producing tyres, comprising the steps of: producing at least one structural component of the processed tyres; supplying said at least one structural component to a toroidal support whose profile essentially reproduces the inner surface of the processed tyre; assembling said at least one structural component on said toroidal support; transferring said processed tyres from one work station to another work station and moving said processed tyres within the same work station in which said at least one structural component is assembled; vulcanizing said processed tyres; wherein said at least one structural component is dynamically accumulated before said supplying step, so that during said assembling step a difference between a produced quantity of said at least one structural component and a required quantity for said assembling step is compensated.

BRIEF DESCRIPTION OF THE DRAWINGS

Further characteristics and advantages will be made clearer by the following detailed description of the present invention.

DETAILED DESCRIPTION OF THE EXEMPLARY EMBODIMENTS

Figure 1:
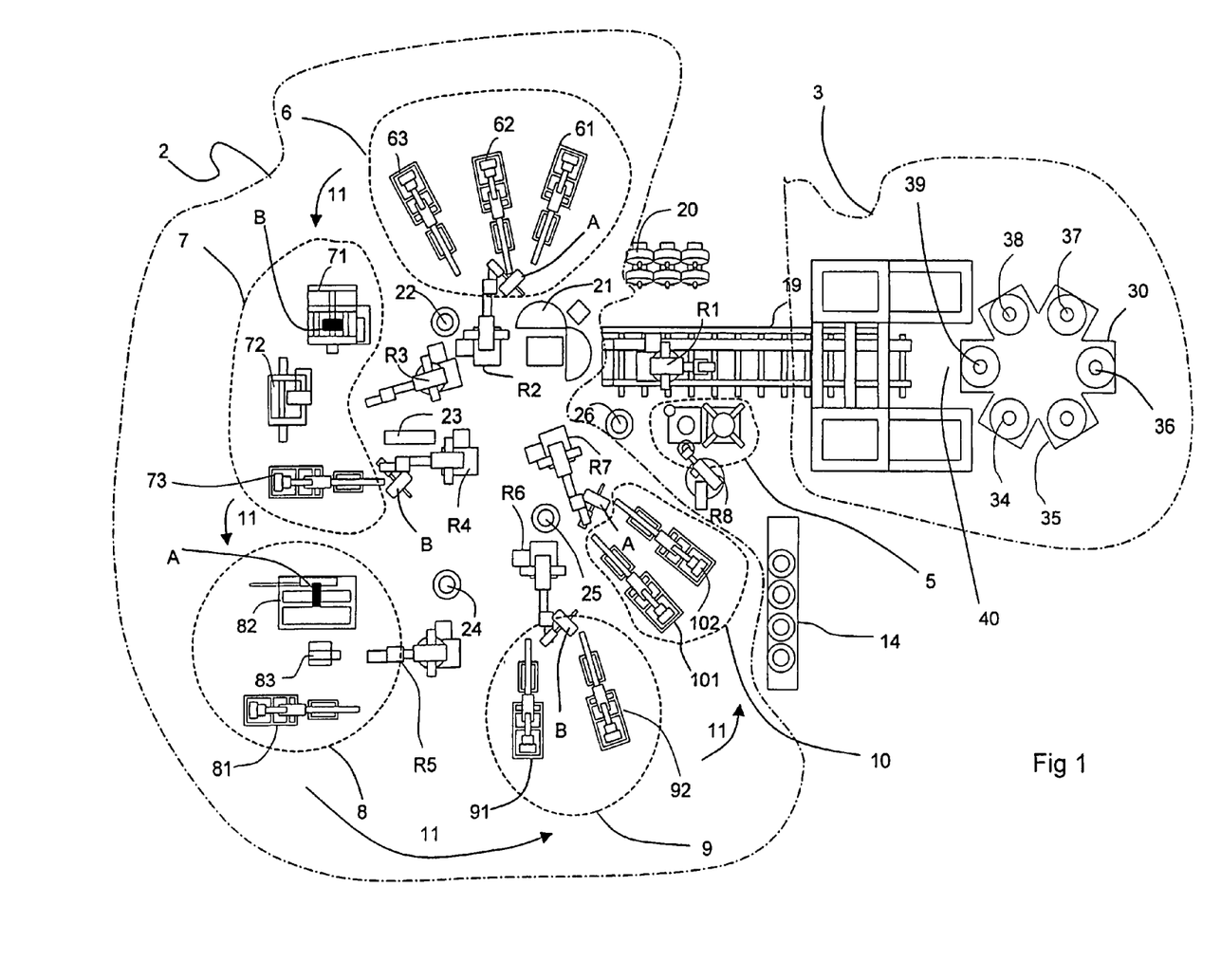
FIG. 1 shows a layout of the plant according to the present invention, indicated as a whole by the number 1.

The plant 1 according to the invention, comprises a manufacturing unit 2 for making a crude tyre, in which each tyre being processed is manufactured by assembling structural components in a predetermined sequence, and a vulcanizing unit 3 in which each tyre arriving from the manufacturing unit 2 is vulcanized in a corresponding mould 34, 35, 36, 37, 38, 39.

The manufacturing unit 2 comprises a plurality of work stations 5, 6, 7, 8, 9, 10, positioned consecutively along a manufacturing path, preferably in the form of a closed loop, as indicated by the arrows 11 in the attached FIG. 1. This line also has a supply station 20, a temperature stabilizing device 21, a first holding station 22, a multiple holding station 23, a second holding station 24, a third holding station 25, and a terminal holding station 26.

The work stations 5, 6, 7, 8, 9, 10 are capable of operating simultaneously, with each one working on at least one tyre being processed, to assemble at least one of the structural components on to each tyre.

More particularly, during the stages of assembly, the various structural components used in making each tyre are conveniently engaged on a supporting member, preferably consisting of a toroidal support or drum whose profile essentially reproduces the inner configuration of the tyre to be produced. This toroidal support is made in such a way that it can easily be removed from the tyre on completion of the processing.

Figure 2:
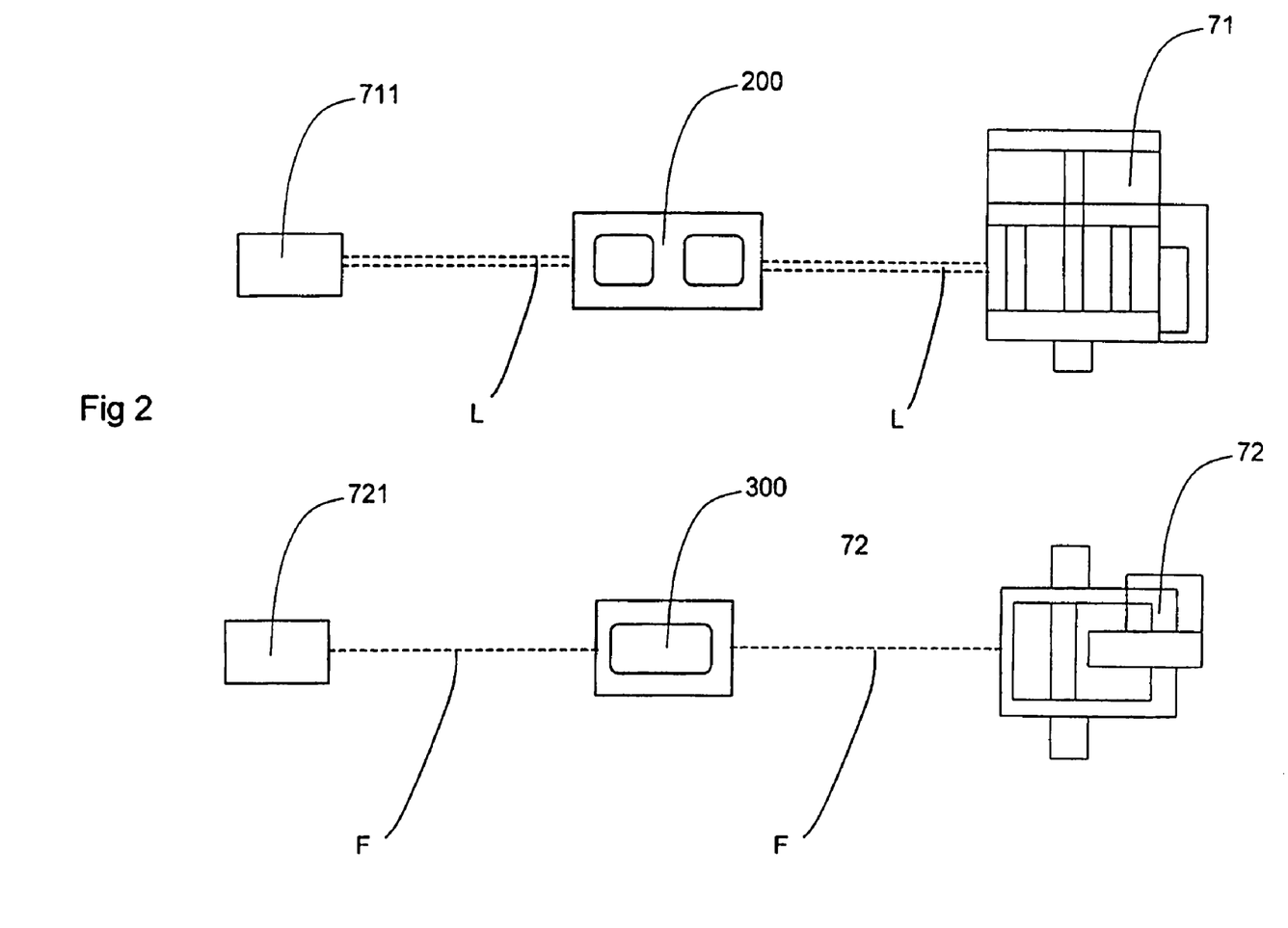
FIG. 2 shows schematically a system for continuously supplying structural components to two processing units according to the present invention.

At least a first and a second type of tyre can be processed simultaneously in both the manufacturing unit 2 and the vulcanizing unit 3. By way of example, in the following description, with reference to the layout shown in the attached FIGS.

1 and 2, two different types of tyre, differing from each other in their dimensional characteristics, are processed simultaneously. Naturally, it is also possible to operate simultaneously on a different number of types which, in addition to or instead of the dimensional differences, can have differences in terms of structural characteristics and/or chemico-physical and/or appearance characteristics.

In the layout shown for guidance in the attached figures, the toroidal supports are represented as being combined with the tyres being processed which are engaged on them, and are identified by the letters A and B, each referring to a specific type of tyre.

As can be observed, the tyres being processed are distributed along the manufacturing unit 2 in such a way that the different types A and B follow each other in a preset sequence.

Devices for the transfer and functional movement of the tyres operate in the plant to transfer each tyre being processed A and B sequentially from one of the work stations 5, 6, 7, 8, 9, 10 of the manufacturing unit 2 to the next station, and to the vulcanizing unit 3. Said devices also functionally move the toroidal support during the deposition of at least one of the structural components.

Preferably, these devices comprise one or more robotic arms R1, R2, R3, R4, R5, R6, R7 and R8, each of which is associated with at least one of the work stations 5, 6, 7, 8, 9, 10, and is capable of operating on the individual toroidal supports, to carry out the sequential transfer of each tyre being processed.

The manufacture of the tyre is carried out by moving the toroidal support and orientating it in space, and applying the extruded structural components to it by both circumferential and axial deposition.

Preferably, a processing unit takes charge of the transfers along said looped path. This unit can control said transfer and functional movement devices in such a way as to co-ordinate the processing steps on each type of tyre in the manufacturing unit 2 and in the vulcanizing unit 3.

More particularly, the illustrated exemplary embodiment provides a first robotic arm R1, movable along a guide structure 19 if necessary, and operating between the manufacturing unit 2 and the vulcanizing unit 3, to pick up a finished tyre from the latter and transfer it to the first work station 5, where the tyre is removed from the corresponding toroidal support and positioned in a discharge station 14 by means of the robotic arm R8. The toroidal support extracted from the tyre is then transferred by the first robotic arm R1 from the first work station 5 into the temperature stabilizing device 21.

If the type to be produced requires the use of a toroidal support different from that which has been dismantled previously, the robotic arm R1 picks up the appropriate toroidal support from the feed station 20 and inserts it into the temperature stabilizing device 21.

This device 21 brings the toroidal support to an adequate temperature to permit the subsequent processing, and particularly to promote the adhesion of the first layer of elastomeric material to the metal of the support. This temperature is preferably in the range from 80° C. to 90° C.

A second robotic arm R2 serves to transfer the toroidal support from the temperature stabilizing device 21 to the second work station 6 where the first constructional components of the tyre are assembled. The assembly operation may, for example, comprise the coating of the outer surface of the toroidal support with a thin layer of airtight elastomeric material, usually called "liner", carried out by a liner processing unit 61, and the application of any necessary elastomeric strips in the areas corresponding to the beads of the tyre, carried out by strip processing units 62, and/or the formation of an additional lining layer made from elastomeric material and laid on top of the liner, carried out by the sub-liner processing unit 63.

Preferably, at the second work station 6, and also at the remaining work stations 7, 8, 9, 10, the formation of each structural component of the tyre is carried out in conjunction with the previously described stage of assembly, by the processing of at least one semi-finished base product which is preferably identical for each type of tyre A or B and supplied in a predetermined quantity according to the type of tyre to be made.

In particular, at the second work station 6, the production of the liner, the elastomeric strips and/or: the additional lining layer can advantageously be carried out by winding at least one strip element made from elastomeric material onto the toroidal support being processed, in consecutively adjacent and if necessary also at least partially superimposed turns, this element having a width, for example, in the range from 0.5 to 3 cm, and being taken directly from a corresponding extruder, from a reel or from other suitable supply devices associated with the second work station 6.

The winding of the turns can be advantageously simplified by giving the second robotic arm R2 the function of holding the toroidal support A, by means of suitable gripping and driving members, and making it rotate about its own axis, thus moving it suitably in front of pressure rollers or equivalent application devices (not described) combined with supply devices, in such a way as to produce a correct distribution of the strip material with respect to the outer surface of the toroidal support.

When the assembly of the components at the second work station 6 has been completed, the second robotic arm R2 deposits the toroidal support, with the corresponding tyre under construction, at the first holding station 22. A third robotic arm R3 picks up the toroidal support from the first holding station 22 and transfers it to the third work station 7, where the structural components which contribute to the formation of the carcass structure of the tyre are assembled.

More particularly, at the third work station 7, one or more carcass plies are produced and assembled, together with a pair of annular reinforcing structures in the areas corresponding to the beads of the tyre. In a similar way, to that described with reference to the operating stages carried out at the second work station 6, each of these structural components is produced directly at the assembly stage, using a semi-finished base product supplied in a predetermined quantity according to the type of tyre being processed.

For example, the carcass ply or plies can be formed by sequentially depositing on the toroidal support a plurality of strip pieces, cut individually from a continuous strip element formed by a band of rubberized cords laid parallel to each other. In turn, each annular reinforcing structure can comprise a circumferential insert consisting, for example, of at least one metal wire element wound in a plurality of radially superimposed turns, together with a filler insert of elastomeric material which can be made by applying an elongate elastomeric element wound in a plurality of axially adjacent and/or radially superimposed turns.

An example of a carcass structure comprises two carcass plies, each consisting of a first and a second series of strip pieces deposited in an alternating sequence on the toroidal support. A pair of annular reinforcing structures of the type described previously is also provided in each bead of the tyre, each of these structures being inserted between the terminal flaps of the pieces belonging to the first and second series respectively, and forming one of the carcass plies, together with an insert applied externally with respect to the second carcass ply.

To facilitate the sequential assembly of the various structural components in the predetermined order, the third work station 7 is made to be equipped with at least three different processing units, designed for the deposition, respectively, of the strip pieces (unit 71), the metal wire element (unit 72), and the elongate elastomeric element (unit 73), which operate simultaneously, each on a corresponding tyre being processed. Consequently, three tyres, even if they are of different types from each other, can be treated simultaneously in the third work station 7, each of the tyres being sequentially transferred from one to another of the processing units until the carcass structure has been completed. The sequential transfer of the tyres into the various processing units provided at the third station 7 can be carried out by the third robotic arm R3, assisted if necessary by a fourth robotic arm R4 and/or by any necessary auxiliary transfer devices and by the multiple holding station 23, in which more than one toroidal support can be present at the same time. This system makes it possible to minimize the waiting periods when the tyres being processed in this work station are of types which differ from each other; this is because the multiple holding station 23 makes it possible to carry out processing on types which require a longer time at the most favourable moment, by advantageously altering the order of the sequence of arrival of the toroidal supports at the work station. In the attached FIG. 1, the unit 71 for depositing the carcass plies is engaged with a type B tyre and the unit 72 for depositing the bead wires is engaged with a type A tyre.

On completion of the carcass structure, the fourth robotic arm R4 deposits the toroidal support at the second holding station 24.

The fifth robotic arm R5 picks up the toroidal support from the second holding station 24, and carries it to the fourth work station 8, which in the illustrated example is occupied by a type A toroidal support. At the fourth work station 8, the structural components serving to form what is known as the belt structure of the tyre are produced and assembled. In particular, a first processing unit 81 provided at the fourth work station 8 deposits, directly on the previously formed carcass structure, two under-belt strips extending circumferentially in the shoulder areas of the tyre. These under-belt strips can be extruded directly from an extruder and applied with the aid of pressure rollers or equivalent application devices. A second processing unit 82 forms a first and second belt strip on the carcass structure, each strip being formed by the sequential deposition of strip pieces laid adjacent to each other circumferentially, each piece being made by cutting to size a continuous strip element consisting of a plurality of cords adjacent and parallel to each other and incorporated in an elastomeric layer. A further processing unit 83 forms a further belt strip by winding a continuous cord in turns which are axially adjacent to each other and radially superimposed on the underlying belt layers.

When the belt structure has been completed, the sixth robotic arm R6 transfers the tyre being processed to the fifth work station 9. At the fifth work station 9, the toroidal support B is engaged by the robotic arm R6 with the aid of which a tread band is applied, this tread band being produced by the winding of at least one further elastomeric strip element in consecutively adjacent and superimposed turns until a tread band having the desired configuration and thickness is obtained. In the illustrated example, the operation is carried out by two units 91 and 92. When the aforesaid operations have been completed, the sixth robotic arm R6 deposits the toroidal support at the third holding station 25.

The tyre is then transferred to the sixth work station 10, occupied by a type A tyre in the illustrated example. At the sixth work station 10, the toroidal support is engaged by the seventh robotic arm R7 which causes it to move suitably in front of corresponding processing units to carry out the application of abrasion-resistant elements to the areas corresponding to the beads (unit 101), and the application of the sidewalls, which are also produced by winding at least one elastomeric strip in adjacent and/or superimposed turns (unit 102).

When this operation is finished, the seventh robotic arm R7 deposits the manufactured tyre - at the terminal holding station 26, before the tyre is transferred to the complex vulcanizing unit 3.

Each of the work stations 5, 6, 7, 8, 9, 10 not only has one or more processing units, but also comprises a feed device for supplying the basic elements required for the production of the corresponding structural component, operating in conjunction with application devices present in the aforesaid units, which apply the basic element and/or the resulting structural component to the tyre being processed.

The vulcanizing unit 3 advantageously comprises at least one set of vulcanizing moulds 34, 35, 36, 37, 38, 39. In the illustrated example, six vulcanizing moulds 34, 35, 36, 37, 38, 39 are provided, each corresponding to the specification of one of the types of tyre manufactured along the line of the complex manufacturing unit 2.

Preferably, the moulds 34, 35, 36, 37, 38, 39 are mounted on a rotatable platform 30 which can be rotated with a step-by-step movement, in such a way that the moulds are made to follow a path, within the complex vulcanizing unit 3, to bring them sequentially, one after the other, next to a loading and discharge station 40 for the tyres being processed. This rotation preferably takes place by means of a first rotation in a first direction of rotation, followed by a rotation in the direction opposite to the first. Alternatively, this rotation may be of the closed loop type.

Each of the moulds 34, 35, 36, 37, 38, 39 is supplied with pressurized steam through a corresponding connecting line (not shown) extending radially from a central column in which steam supply devices, consisting of a boiler for example, are integrated or connected in another way. The whole rotatable platform 30 can advantageously be enclosed in an insulated structure having at least one access aperture located next to the loading and discharge station 40, in order to prevent excessive dissipation of heat to the exterior.

Advantageously, the transfer of the individual tyre being processed into the corresponding moulds 34, 35, 36, 37, 38, 39 is carried out by the robotic arm R1 at a rate equal to the rate of completion of the crude tyres being processed in the work stations distributed along the line of the complex manufacturing unit 2.

FIG. 2 shows schematically a system for continuously supplying a structural component to a processing unit, comprising a machine for producing this structural component, a dynamic storage unit, and said processing unit.

FIG. 2 shows schematically two processing units 71 and 72, each connected to a dynamic storage unit 200 and 300 and to corresponding machines 711 and 721 for preparing said structural components.

In particular, in FIG. 2, the processing units are the processing unit 71 for depositing the carcass plies and the processing unit 72 for depositing the bead wires. Said carcass plies are structural components of the strip type, made in a suitable machine 711 for preparing carcass plies. Said bead wires are structural components of the filamentary type, made in a suitable machine 721 for making bead wires.

Both of said machines carry out the rubberizing of cords (a single cord for the bead wires and a plurality of parallel cords, forming a band, for the carcass plies), by means of an extrusion process, for example. Thus the components can be supplied continuously towards said processing units.

It is clear from the present description that the quantity of said structural components required by said processing units is variable when different types of tyres are processed. For example, it is variable for the carcass plies according to the specification and the type (for example, a "single-ply" or "two-ply" type) of tyre being processed.

The Applicant has constructed a dynamic storage unit to provide compatibility between the quantities of a specific structural component required by said processing unit and the quantities of structural components produced by said machine.

Figure 3:
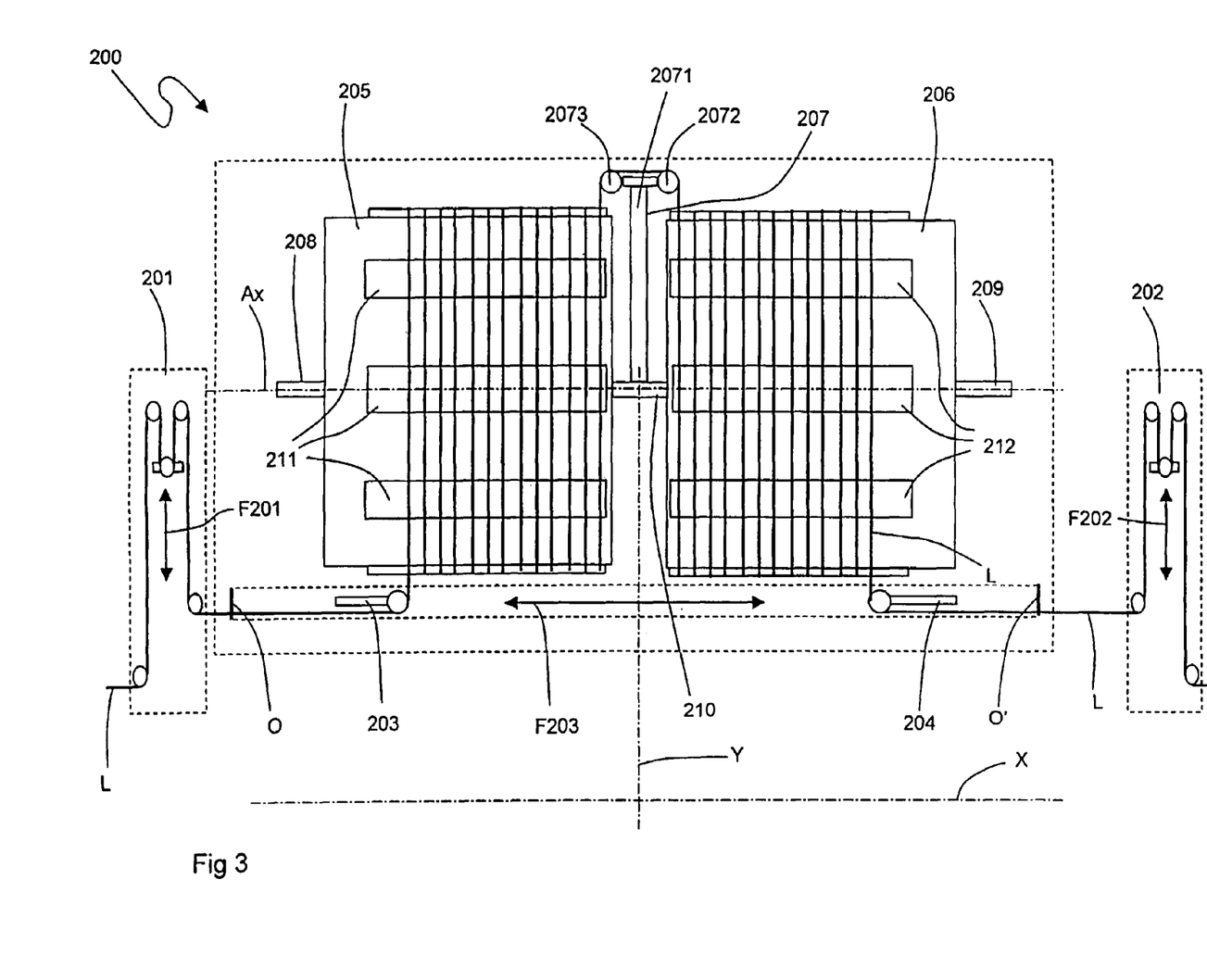
FIG. 3 shows a first embodiment of a dynamic storage unit according to the present invention.

FIG. 3 shows a first embodiment of this dynamic storage unit 200, comprising an input transit device 201 for receiving continuously from one of said machines 711 or 721 a windable element which is the precursor of a specific structural component which is formed, and an output transit device 202 for transferring said structural component to one of said processing units 71 or 72.

In particular, in the example in FIG. 3, said structural component is a strip component L from which the carcass structure is formed in the unit 71 of FIG. 2.

Said transit devices comprise a plurality of pulleys, of which at least one is movable in the direction of the arrows F201 and F202, to allow a variable quantity of strip component L to be stored.

In particular, these transit devices make it possible to store a quantity of strip component L varying from a specified minimum to a specified maximum. The position of the movable pulley, on which a position transducer is fitted, determines this specified quantity.

For the purposes of the present description, the term "specified quantity" of a structural component denotes a specified length of this component.

Said dynamic storage unit also comprises a winding device 203, an unwinding device 204, a first winding reel 205 and a second winding reel 206 on which said strip component is wound. Said first reel rotates around a first shaft 208 and said second reel rotates around a second shaft 209. Said first shaft and said second shaft are preferably coaxial. In particular, in FIG. 3 the two reels rotate about the same axis of rotation Ax.

Each of these reels is shaped with a lateral surface on which said strip components can be wound in turns lying side by side. Preferably, these reels are of cylindrical shape. More preferably, said lateral surfaces of the reels have equal lengths and radii.

Each of the two reels is moved by a suitable electric motor (not shown in the figure) which rotates at a specified speed.

A device 207 for transferring said strip component from said first reel to said second reel is positioned between said two reels. This transfer device comprises a rotating arm 2071, one end of which is fixed to a third shaft 210, preferably coaxial with said first shaft 208 and second shaft 209, while the opposite end has a pair of pulleys 2073 and 2072, on which said strip component L runs.

Preferably, said rotating arm 210 rotates about said axis Ax. Additionally, this transfer device is moved by a suitable electric motor (not shown in the figure).

The winding and unwinding devices are preferably located at the bases of the two reels. The winding device is movable along said lateral surface of said first reel, along a traversing axis preferably parallel to said axis, of rotation Ax. The unwinding device is movable along said lateral surface of said second reel, preferably along a traversing axis parallel to said axis of rotation Ax. More preferably, said winding device and said unwinding device move along a common traversing axis X in the direction indicated by the arrows F203 in FIG. 3.

Each of the two reels 205 and 206 is preferably provided with a plurality of traversing belts 211 and 212. The turns of said strip component are wound on said traversing belts, which are driven by a suitable electric motor (not shown in FIG. 4) and can move said turns along said common traversing axis X.

Preferably, said winding and unwinding devices are moved along said traversing axis by the same motor. A position transducer is associated with said winding and/or unwinding devices and can detect the position which they assume along said traversing axis with respect to a fixed reference, for example with respect to end of travel positions 0 and 0' for these devices.

Preferably, said winding and unwinding devices move in a symmetrical way with respect to an axis Y orthogonal to said axis of rotation Ax. If the movement is symmetrical, a single position transducer is used, associated with said winding device or with said unwinding device.

Preferably, the traversing belts 211 of the first reel move in a symmetrical way with respect to the movement of the traversing belts 212 of the second reel.

A programmable logic unit associated with this storage unit controls the movement of said motors and reads from said transducers the position of the movable pulleys and of the winding and unwinding devices.

The storage device according to the present invention illustrated in FIG. 3 operates as follows.

The machine 711 for preparing carcass plies supplies a specified quantity of strip component per unit of time, which can be defined as a length of band supplied in the unit of time. This supplied band is temporarily wound on said input transit device 201 until said movable pulley reaches a position such that said specified maximum is reached. At this point, the programmable logic unit activates the motor of the first reel 205, thus causing it to rotate.

The traversing belts position the turns of the band side by side with a specified pitch. The winding device moves along said axis X at the same traversing speed as said traversing belts. This co-coordinated traversing can advantageously be achieved by means of synchronizing mechanisms between the motors. Alternatively, the synchronization of said co-coordinated traversing can be achieved by means of said programmable logic unit.

For the purposes of the present description, the term "turns lying side by side" denotes that said turns can be spaced apart with a specified pitch, or in other words that the turns can be in contact with each other, but not overlapping each other. A considerable overlap, amounting, for example, to at least a tenth of the width in the case of a strip component, would impede the correct unwinding of the turns from said reel.

The band is wound on to said reel and is simultaneously unwound from said input transit device. The quantity of band wound onto said first reel depends on the instant at which the movable pulley reaches the position corresponding to said specified minimum. When this position has been reached, the first reel ceases to rotate and therefore to accumulate band on itself.

As said first reel rotates, the programmable logic unit simultaneously activates the transfer device 207, which is made to rotate in such a way as to pick up a specified quantity of band and transfer it to said second reel. The movement of the traversing bands of the second reel places the turns side by side with a specified pitch. The pitch between one turn and another in the first reel is preferably the same as that for the turns on the second reel.

During the processing of a tyre, and particularly during the deposition of the carcass plies in the example shown in FIG. 2, the processing unit 71 requires a specified quantity of band according to the type of tyre being processed. The band is taken up by said output transit device until the position transducer on the movable pulley reaches the position corresponding to said specified minimum. The programmable logic unit activates the motor of the second reel 206, causing it to rotate and unwinding the band from this reel so that it can be newly stored on said output transit device.

All the rotations and traversing movements of the devices in the dynamic storage unit are controlled in such a way as to provide the best control of the flow of band sent to said processing unit. Preferably, said device for transferring from said first reel to said second reel rotates at a speed which is half of the difference between the speeds of rotation of the two reels. Thus the number of turns present on the first reel is equal to the number of turns present on the second reel.

Preferably, the number of turns of band wound on the reels is preset by assigning a specified reference maximum load position along said traversing axis.

On said first reel the band is wound in turns from the end of this reel closer to the second reel, with a predetermined number of turns, until said specified reference position is reached along said traversing axis.

In a symmetrical way, the second reel is wound in turns from the end of the reel closer to said first reel, with a predetermined number of turns, essentially the same number of turns as those wound on the first reel, until it reaches a corresponding specified reference position along said traversing axis.

The dynamic storage unit is initially activated by manually passing the band onto it. Initially, the device has its reels empty; for activation, the band is inserted manually into said input transit device and into said winding device, which is positioned in the proximity of the axis of symmetry Y with respect to said empty reel. After this, a turn of band is wound on to said first reel, and the band is then passed through the pair of pulleys 2072 and 2073 of said transfer device 2071. The band leaving said device is wound for one turn on to said second reel, and from there, by means of said unwinding device, which is placed in a symmetrical position with respect to said winding device, the band is finally wound on to said output transit device and sent to the processing unit 71.

When the second reel is kept stationary, an equal predetermined number of turns can be wound on to both reels; this is because, since the speed of rotation of the transfer device is half of the two speeds of rotation of the reels, if the second reel is stationary, the speed of rotation of the transfer device is half of the speed of rotation of the first reel. For example, if a quantity of band corresponding to 50 turns is supplied, and the second reel is kept stationary, the turns will be distributed so that there are 25 on the first reel and 25 on the second reel.

During the operation of the storage device, according to the requirements of the plant, the difference between the quantity of band required by the processing unit and the quantity of band supplied by said machine 711 is distributed equally on both reels.

If production is halted in said processing unit 71, for any necessary maintenance of the unit for example, said storage unit enables the machine 711 to continue to supply a quantity of band, which will be wound on the two reels. If there is a prolonged stoppage of said processing unit, then when the reels are filled with a quantity close to said specified maximum load position, the storage unit can act on said band supply machine in order to decrease its output.

The storage device according to the present invention, in this embodiment, is particularly suitable for winding a band of the type used in the carcass structure. This is because this band is flat and windable but not twistable. The winding of this type of band on a conventional reel, starting from one of its ends, and the unwinding of this type of band from the opposite end of said reel, would tend to twist the band through 180°.

The strip pieces which form the carcass plies are formed from said band. These pieces are deposited on the toroidal support as described above. A twist undergone by the band during winding and unwinding on the same reel causes a deformation of said strip pieces, which could in turn cause imperfect deposition on said toroidal support, particularly in the bead area of the tyre.

Since it uses two reels wound symmetrically with respect to each other with said band, the storage device according to the present invention does not generate any twist in the band, and thus avoids the deformation of said strip pieces.

Figure 4:
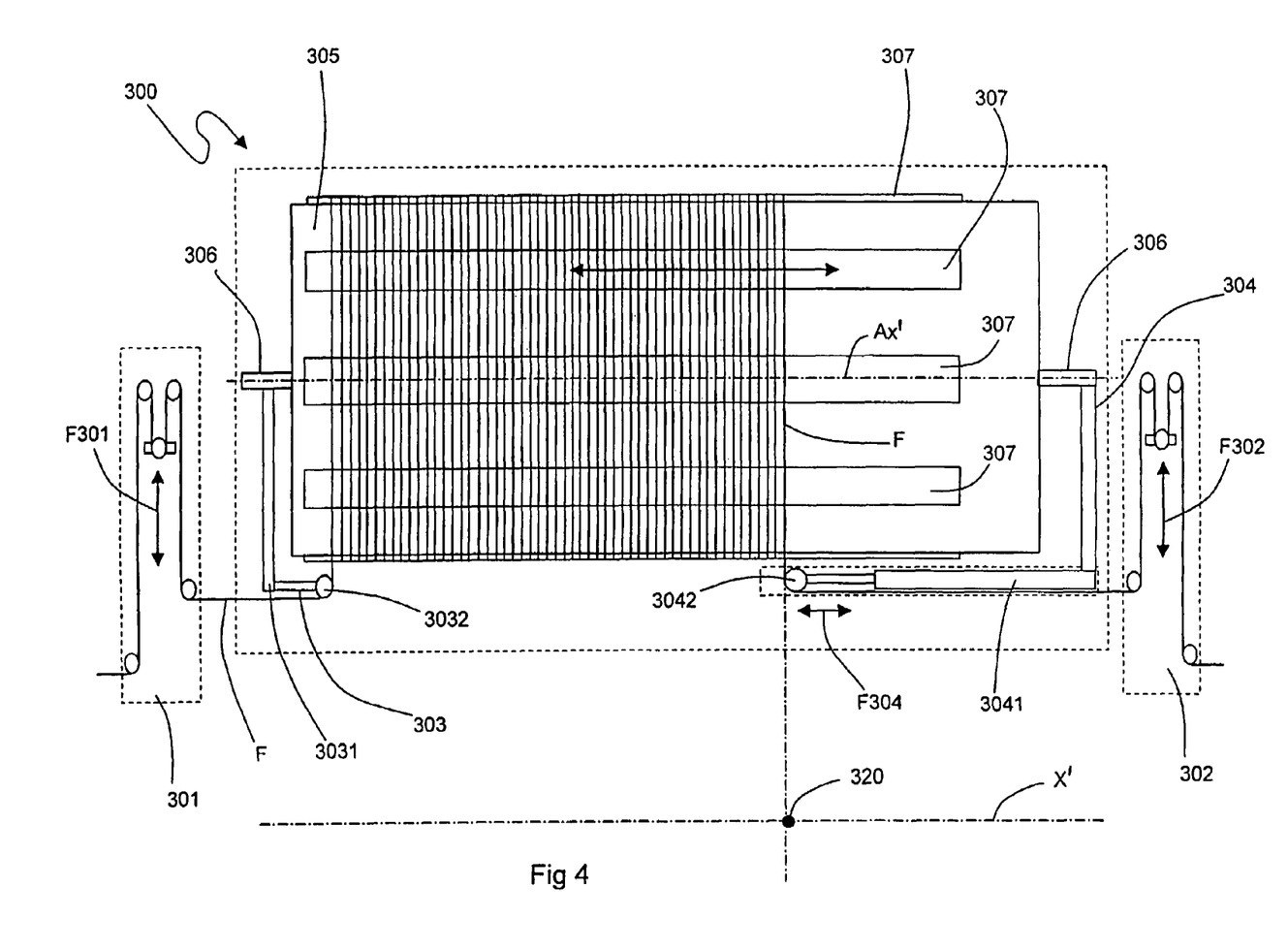
FIG. 4 shows a second embodiment of a dynamic storage unit according to the present invention.

FIG. 4 shows a second embodiment of this dynamic storage unit 300, comprising an input transit device 301 for receiving continuously from one of said machines 711 or 721 a specific structural component which is formed, and an output transit device 302 for transferring said structural component to one of said processing units 71 or 72.

In the example shown in FIG. 4, said structural component is a filamentary component F from which the carcass structure is formed in the unit 72 of FIG. 2.

These transit devices comprise a plurality of pulleys of which at least one is movable-in the direction of the arrows F301 and F302, to enable a variable quantity of filamentary component F to be stored.

In particular, these transit devices make it possible to store a quantity of filamentary component F varying from a specified minimum to a specified maximum. The position of the movable pulley, with which a position transducer is associated, determines this specified quantity.

Said dynamic storage unit also comprises a winding device 303, an unwinding device 304 and a winding reel 305 on which said filamentary component is wound.

Said reel is fixed to a shaft 306.

This reel is shaped with a lateral surface on which said filamentary component F can be wound in turns lying side by side. Preferably, this reel has a cylindrical shape.

Said reel is moved by a suitable electric motor (not shown in the figure) which rotates at a specified speed.

Said winding device 303 preferably comprises a rotating arm 3031, one end of which is fixed to said shaft 306, while its opposite end has a pulley 3032, on which said filamentary component F runs.

Preferably, said rotating arm 3031 rotates about the central axis Ax' of this reel. Additionally, this winding device is moved by a suitable electric motor (not shown in the figure).

Said unwinding device 304 comprises a rotating arm 3041, one end of which is fixed to said shaft 306, while its opposite end has a pulley 3042, on which said filamentary component F runs.

Preferably, said rotating arm 3041 rotates about said axis Ax'. Additionally, this winding device is moved by a suitable electric motor (not shown in the figure).

The winding and unwinding devices are preferably located at the bases of the two reels. The unwinding device is movable along said lateral surface of said first reel, along a traversing axis X', preferably parallel to said axis of rotation Ax', in the direction indicated by the arrows F304 in FIG. 4.

A position transducer is associated with said unwinding device and can detect the position assumed by it along said traversing axis with respect to a fixed reference, for example with respect to an end of travel position, and with respect to the position of the last turn of strip component wound on said reel.

The reel 305 is provided with a plurality of traversing belts 307. The turns of said filamentary component are wound on said traversing belts, which are driven by a suitable electric motor (not shown in FIG. 4) and can move said turns along said traversing axis X'.

A programmable logic unit associated with this storage unit controls the movement of said motors and reads from said transducers the position of the movable pulleys and of the unwinding device.

In practice, the winding device and said unwinding device operate independently of each other, since no force is applied to them by said programmable logic unit when the input and/or output transit device reaches said specified maximum or minimum position.

The storage device according to the present invention illustrated in FIG. 4 operates as follows.

The machine 721 for preparing said filamentary component supplies a specified quantity of component per unit of time, which can be defined as a length of filament supplied in the unit of time. This filament is temporarily wound on said input transit device 301 until said movable pulley reaches a position such that said specified maximum is reached. At this point the programmable logic unit activates the winding device, which, when made to rotate, winds turns of filament on to said reel and simultaneously unwinds a corresponding quantity of filament from said input transit device.

The quantity of filament wound on to said reel depends on the position of the movable pulley with respect to the position of this pulley corresponding to said specified minimum. When this specified minimum position has been reached, the winding device ceases to rotate and therefore ceases to accumulate filament on said reel.

While the filament is being wound on to the reel, the traversing belts move in such a way as to position the turns side by side with a specified pitch.

The programmable logic unit determines said pitch and simultaneously keeps the unwinding device aligned with the position of the first turn that is wound.

During the processing of a tyre, and particularly, as in the example in FIG. 2, during the deposition of the bead wires, the processing unit 72 requires a specified quantity of strip or filamentary component, according to the type of tyre being processed. The filament is taken from said output transit device, until the position transducer on the movable pulley reaches the position corresponding to said specified minimum. The programmable logic unit activates the motor of the unwinding device, in such a way as to rewind onto said transit device the quantity taken by the processing unit.

All the rotations and traversing movements of the devices in the dynamic storage unit are controlled in such a way as to provide the best control of the flow of filament which is sent to said processing unit.

Preferably, the number of turns of filament wound onto said reel is preset by assigning a specified maximum load reference position along said traversing axis X'.

On said reel, the filament is -wound in turns, starting from the end of the reel closer to said winding device, until said preset reference position is reached along said traversing axis (in FIG. 4, said reference position is indicated by the numerical reference 320).

The dynamic storage unit of FIG. 4 is initially activated by manually passing the filament onto it. Initially, the device has no turns of filament on its reel; for activation, the filament is inserted manually into said input transit device and into said winding device. At least one turn of filament is then wound onto said reel.

The filament leaving said reel is passed through said unwinding device and finally wound onto said output transit device and sent to the processing unit 72.

When the unwinding device is kept stationary, a predetermined number of turns can be wound on to said reel. This number of turns comprises a quantity of strip component essentially equal to the quantity supplied by the machine which produces said strip component.

During the operation of the storage device, according to the requirements of the plant, the difference between the quantity of filament required by the processing unit and the quantity of filament supplied by said machine 721 is distributed on said reel.

If production is halted in said processing unit, for any necessary maintenance of the unit for example, said storage unit enables the machine to continue to supply a specified quantity of filament, which will be wound on to said reel. If there are prolonged stoppages of said processing unit, then when said reel has been filled with a quantity close to said specified maximum load position, the storage unit can act on said filament supply machine in order to decrease its output.

The winding device and said unwinding device operate independently of each other, since no force is applied to them by said programmable logic unit when the input and/or output transit device reaches said specified maximum or minimum position.

Preferably, said windable element is introduced into said dynamic storage unit at a specified speed, essentially similar to the rate of production of said component. Preferably, said windable element is extracted from said storage unit at a specified speed such that the requirement of said processing unit is satisfied.

The Applicant has constructed a prototype of each of the two embodiments of said dynamic storage unit.

A processing unit for the deposition of the carcass plies requires, on average, a quantity of band approximately ranging from 80 to 100 meters per minute; a machine for producing said band supplies a quantity of band which on average is 70 meters per minute. The prototype of the dynamic storage unit according to the first embodiment has two reels with a diameter of 80 cm each, can hold approximately 600 meters of band, and can wind up to 80 meters of band per minute and unwind up to 100 meters of band per minute. The processing unit for the deposition of the carcass plies requires a downtime ranging from a minimum of approximately 10 seconds to a maximum of 40 minutes between one processing cycle and the next.

A processing unit for the deposition of the bead wires requires, on average, a quantity of filament approximately ranging from 80 to 100 meters per minute; a machine for producing said filament supplies a quantity of filament which on average is 70 meters per minute. The prototype of the dynamic storage unit according to the second embodiment has a reel with a diameter of 80 cm, can hold approximately 500 meters of filament, and can wind up to 100 meters of filament per minute and unwind up to 180 meters of filament per minute. The processing unit for the deposition of the carcass plies requires a downtime ranging from a minimum of approximately 10 seconds to a maximum of 30 minutes between one processing cycle and the next.

This dynamic storage unit has limited overall dimensions. In the embodiment with two reels, each reel has a maximum length of approximately 2 meters, making the maximum total length of the storage unit approximately 5 meters, with a maximum width of 1.5 meters. The maximum overall height of the storage unit is approximately 2 meters.

In the single-reel embodiment, the overall dimensions are slightly smaller, since the single reel has a maximum length of approximately 3 meters. The other dimensions are essentially similar to those of the two-reel embodiment. The limited overall dimensions constitute a characteristic of the storage unit according to the present invention. This is because the limited quantity of structural component used by the plant makes it unnecessary to store large quantities of it on the reels, even when there are significant differences between the rate of production of said structural components and the rate of deposition of said components onto a tyre being manufactured. Naturally, if the need arises to store a greater quantity of structural component on said reels, the dimensions of said reels can be increased. In this case, it is considered that the dimensions should not be significantly more than twice the dimensions indicated in the examples.

The invention claim is:

1. An automatic plant for producing tyres, comprising:
   a manufacturing unit comprising a plurality of work stations;
   a plurality of devices for transferring the tyres from one work station to another work station and for moving the tyres within a same work station; and
   a vulcanizing unit;
   wherein each work station is designed to assemble one or more corresponding structural components of the tyres,
   wherein at least one of the structural components is supplied from a machine for producing the at least one structural component, through a dynamic storage unit, and to at least one of the work stations, the dynamic storage unit having a first and a second winding reel, each winding reel having a lateral surface, a winding device for winding the at least one structural component on the first winding reel, and an unwinding device for unwinding the at least one structural component from the second winding reel, the winding device being capable of traversing at least a portion of said lateral surface of the first winding reel along an axis parallel to an axis of rotation of the first winding reel and the unwinding device being capable of traversing at least a portion of said lateral surface of the second winding reel along an axis parallel to an axis of rotation of the second winding reel,
   wherein the winding device and the unwinding device operate independently of each other, and
   wherein the vulcanizing unit comprises at least one vulcanizing mould for the tyres.

2. The plant of claim 1, wherein at least one winding reel comprises a plurality of belts that move in a traversing direction parallel to a central axis of the at least one winding reel.

3. The plant of claim 1,
   wherein the first winding reel rotates about the axis of rotation of the first winding reel at a first predetermined speed and the second winding reel rotates about the axis of rotation of the second winding reel at a second predetermined speed.

4. The plant of claim 3, further comprising a device for transferring the at least one structural component from the first winding reel to the second winding reel.

5. The plant of claim 1, wherein each of the work stations assembles the at least one structural component on a toroidal support, and
   wherein a profile of the toroidal support essentially reproduces an inner configuration of one of the tyres.

6. The plant of claim 5, wherein the dynamic storage unit enables production of the at least one structural component to be kept essentially unchanged in a presence of variations in speed during assembling of the at least one structural component on the toroidal support.

7. The plant of claim 1, wherein the at least one work station comprises different processing units designed for deposition of the at least one structural component.

8. The plant of claim 7, wherein at least two of the processing units are connected to respective dynamic storage units, and
   wherein the respective dynamic storage units are connected to corresponding machines producing the at least one structural component.

9. The plant of claim 8, wherein at least one of the processing units performs deposition of strip components.

10. The plant of claim 8, wherein at least one of the processing units performs deposition of filamentary components.

11. The plant of claim 1, wherein at least some of the tyres are different from each other.

12. A method for producing tyres, comprising:
    making at least one structural component of the tyres;
    supplying the at least one structural component to a toroidal support whose profile essentially reproduces an inner surface of one of the tyres;
    assembling the at least one structural component on the toroidal support;
    transferring the tyres from one work station to another work station;
    moving the tyres within a same work station at which the at least one structural component is assembled; and
    vulcanizing the tyres;
    wherein the at least one structural component is dynamically accumulated on a dynamic storage unit before supplying the at least one structural component, the dynamic storage unit having a first and a second winding reel, each winding reel having a lateral surface, a winding device for winding the at least one structural component on the first winding reel, and an unwinding device for unwinding the at least one structural component from the second winding reel, the winding device being capable of traversing at least a portion of said lateral surface of the first winding reel along an axis parallel to an axis of rotation of the first winding reel and the unwinding device being capable of traversing at least a portion of said lateral surface of the second winding reel along an axis parallel to an axis of rotation of the second winding reel; and
    wherein the winding device and the unwinding device operate independently of each other.

13. The method of claim 12, wherein at least some of the tyres are different from each other.

14. The method of claim 12, wherein the making of the at least one structural component comprises a productivity that is kept substantially unchanged during the assembling of the at least one structural component.

15. The method of claim 12, wherein, during the dynamic accumulation of the at least one structural component, the making of the at least one structural component is kept essentially unchanged in a presence of any variations in speed during the assembling of the at least one structural component.

* * * * *